(12) United States Patent
Hermansson (10) Patent No.: US 9,021,912 B2
(45) Date of Patent: May 5, 2015

(54) SHIFTING APPARATUS

(75) Inventor: Bengt Hermansson, Mullsjö (SE)

(73) Assignee: Kongsberg Automotive AB, Mullsjo (SE)

( * ) Notice: Subject to any disclaimer, the term of this patent is extended or adjusted under 35 U.S.C. 154(b) by 317 days.

(21) Appl. No.: 13/191,932

(22) Filed: Jul. 27, 2011

(65) Prior Publication Data

US 2013/0025395 A1 Jan. 31, 2013

(51) Int. Cl.
| | |
|---|---|
| *G05G 9/00* | (2006.01) |
| *F16H 59/04* | (2006.01) |
| *G05G 5/03* | (2008.04) |
| *F16H 61/24* | (2006.01) |
| *F16H 59/12* | (2006.01) |

(52) U.S. Cl.
CPC ............... *G05G 5/03* (2013.01); *Y10T 74/2014* (2013.01); *F16H 61/24* (2013.01); *F16H 59/12* (2013.01)

(58) Field of Classification Search
CPC ... F16H 59/12; F16H 61/24; F16H 2061/243; G05G 5/03; G05G 5/05
USPC .................. 74/473.1, 473.3, 473.24, 473.25; 200/548, 556, 539
See application file for complete search history.

(56) References Cited

U.S. PATENT DOCUMENTS

| | | | |
|---|---|---|---|
| 2,491,315 A | * | 12/1949 | Johnson ........................... 74/527 |
| 3,598,934 A | * | 8/1971 | O'Connor, III ............. 200/16 C |
| 4,630,493 A | | 12/1986 | Kato |
| 4,827,793 A | | 5/1989 | Loeffler et al. |
| 4,912,997 A | | 4/1990 | Malcolm et al. |
| 5,852,953 A | | 12/1998 | Ersoy |
| 6,658,959 B2 | | 12/2003 | Wildeshaus et al. |
| 6,923,083 B2 | | 8/2005 | Fujinuma |
| 7,137,475 B2 | | 11/2006 | Shiomi et al. |
| 7,565,849 B2 | | 7/2009 | Sauder, Jr. |
| 2002/0056334 A1 | | 5/2002 | Fujinuma |
| 2008/0047384 A1 | | 2/2008 | Hattori |

(Continued)

FOREIGN PATENT DOCUMENTS

| | | |
|---|---|---|
| DE | 102009036349 | 3/2010 |
| EP | 2184517 A1 | 5/2010 |

(Continued)

OTHER PUBLICATIONS

English language translation of abstract for DE102009036349 extracted from espacenet Jan. 30, 2013, 1 page.

(Continued)

*Primary Examiner* — William Kelleher
*Assistant Examiner* — Emily Cheng
(74) *Attorney, Agent, or Firm* — Howard & Howard Attorneys PLLC (57) ABSTRACT

A haptic device for an actuator of a gear selector for a vehicle. The haptic device includes a first element and a second element coupled to one another and movable from a rest position, when the actuator is in a disengaged position, to a triggered position, when the actuator is moved to an engaged position. The elements define a space for accepting a slide between the first and second elements. A biasing member continuously biases the first and second elements toward one another. The slide defines a contoured surface. A cam follower selectively engages the contoured surface and urges the first and second elements toward the triggered position to create the tactile feedback to the actuator.

12 Claims, 13 Drawing Sheets

(56) References Cited

U.S. PATENT DOCUMENTS

2009/0133525 A1    5/2009    Sauder, Jr.
2010/0116075 A1    5/2010    Moreno Colom et al.

FOREIGN PATENT DOCUMENTS

| | | |
|---|---|---|
| EP | 2551555 A1 | 1/2013 |
| JP | 59164230 A | 9/1984 |
| JP | 61115222 | 7/1986 |
| JP | 2101172 | 8/1990 |

OTHER PUBLICATIONS

English language abstract for JP59164230 extracted from espacenet Jan. 30, 2013, 2 pages.

English language abstract for JP61115222 extracted from espacenet Feb. 25, 2013, 2 pages.

European Search Report for Application No. EP 12178377, Nov. 19, 2012, 2 pages.

* cited by examiner

SHIFTING APPARATUS

FIELD OF THE INVENTION

The present invention relates to a shifting apparatus, and more specifically, to a haptic device for use with the shifting apparatus.

BACKGROUND

Many attempts have been made in the art to improve upon gear selection in a vehicle. There is a growing trend in the industry to move away from mechanical shifting mechanisms, particularly in automotive applications. The mechanical shifting mechanisms require the user/driver to exert a significant amount of force on a gear shift stick or knob, to change gears. Additionally, the mechanical mechanisms are limited as to where the mechanism can be placed within the vehicle, i.e. in a center console or on the floor of the vehicle. Further, most mechanical mechanisms require that a large hole be made through the floor of the vehicle to physically couple the shifting mechanism to the transmission of the vehicle, this may create sealing and noise problems for the vehicle manufacturers.

One solution that is gaining popularity are electronic shift systems, also known as shift-by-wire. The electronic shift systems overcome many of the disadvantages of the mechanical mechanisms. The electronic systems are typically smaller and modular, thereby allowing for greater flexibility of placement in the vehicle, such as on the dashboard, on the steering column, and of course within the center console. Additionally, there is no need for a direct, physical connection to the transmission, eliminating the large hole that was previously needed.

Vehicle manufactures have attempted to replicate the "feeling" of shifting the mechanical mechanisms by creating devices that give the user/driver a tactile feedback when making the gear selection. Many of these tactile feedback devices are integrated into devices that appear similar in form to the previously used gear shift sticks or knobs. Unfortunately, these devices remain bulky and continue limit the placement of the shifting mechanisms in the vehicle. Therefore there remains an opportunity in the art for an improved shifting mechanism that provides a tactile feedback to the user/driver.

SUMMARY AND ADVANTAGES

The present invention provides a shifting apparatus for selecting a gear position of a vehicle and provides a tactile feedback to a user and a method of using the apparatus. The shifting apparatus includes a housing adapted to be disposed within the vehicle and at least one actuator coupled to the housing. The actuator is movable between a disengaged position and at least one engaged position. The apparatus also includes a haptic device. The haptic device includes a first element and a second element coupled to one another and movable between a rest position and a triggered position. The elements define a space for accepting a slide therein. The slide has a contoured surface. A biasing member continuously biases the first and second elements toward one another. A cam follower selectively engages the contoured surface and urges the first and second elements toward the triggered position to create the tactile feedback through the actuator to the user.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION

Referring to the Figures wherein like numerals indicate like or corresponding parts throughout the several views, a haptic device is generally shown at 20 in FIGS. 2 through 11.

Figure 1:
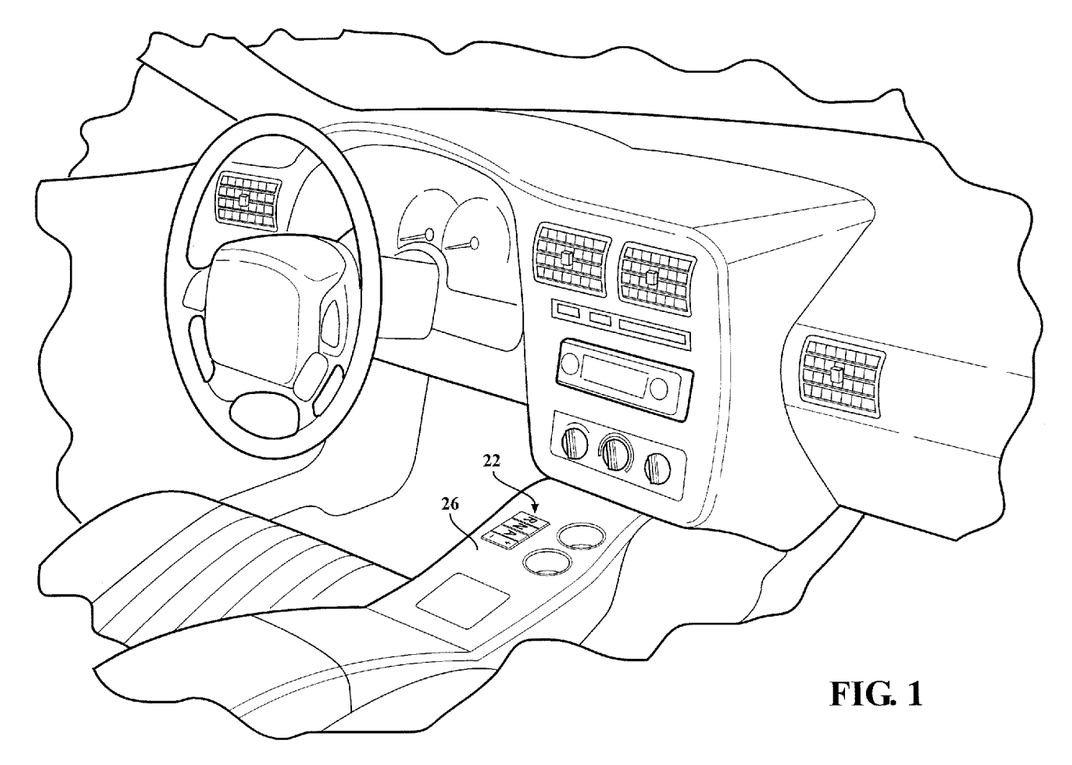
FIG. 1 is a perspective view of an interior of a vehicle with a shifting apparatus including a haptic device.

The haptic device 20 is integrated into a gear shifting apparatus 22 for a vehicle. Typically the apparatus 22 is disposed within a center console 26 of the vehicle, as shown in FIG. 1. However, the apparatus 22 may be coupled to other portions of the interior of the vehicle, such as the instrument panel or the dashboard.

Figure 2:
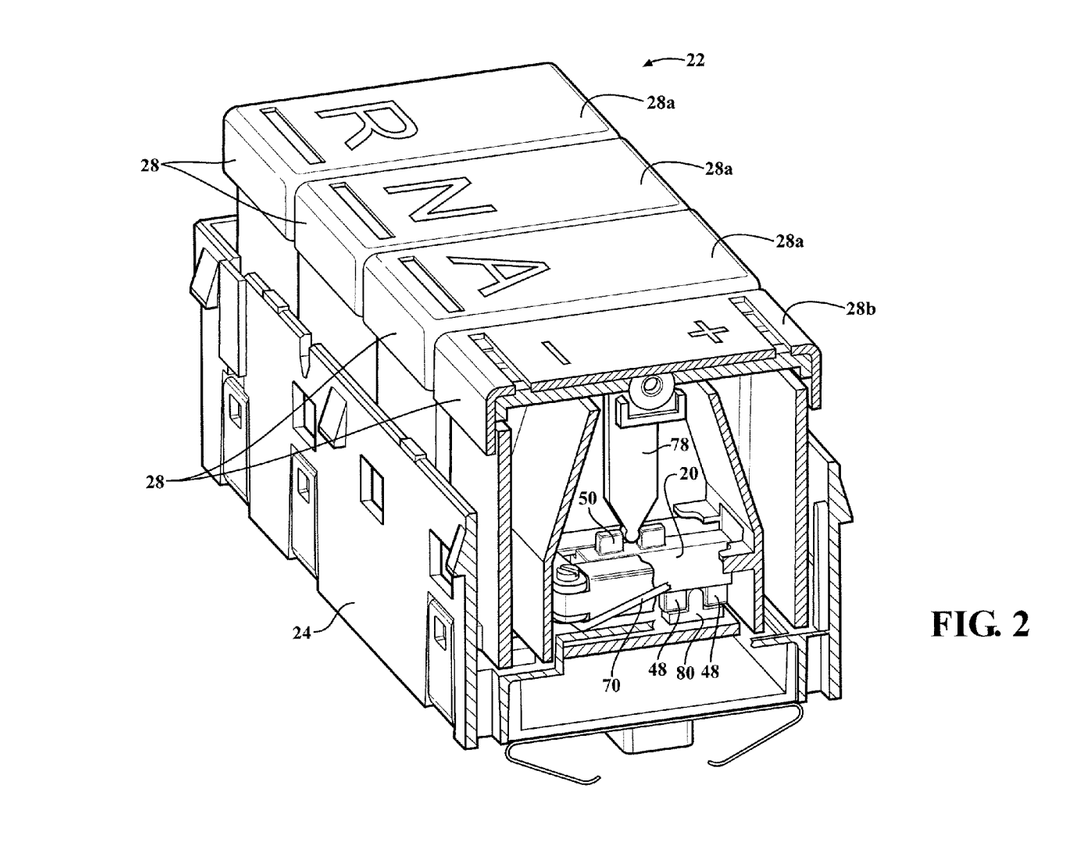
FIG. 2 is a perspective partial cross-sectional view of the shifting apparatus including the haptic device.
Figure 3:
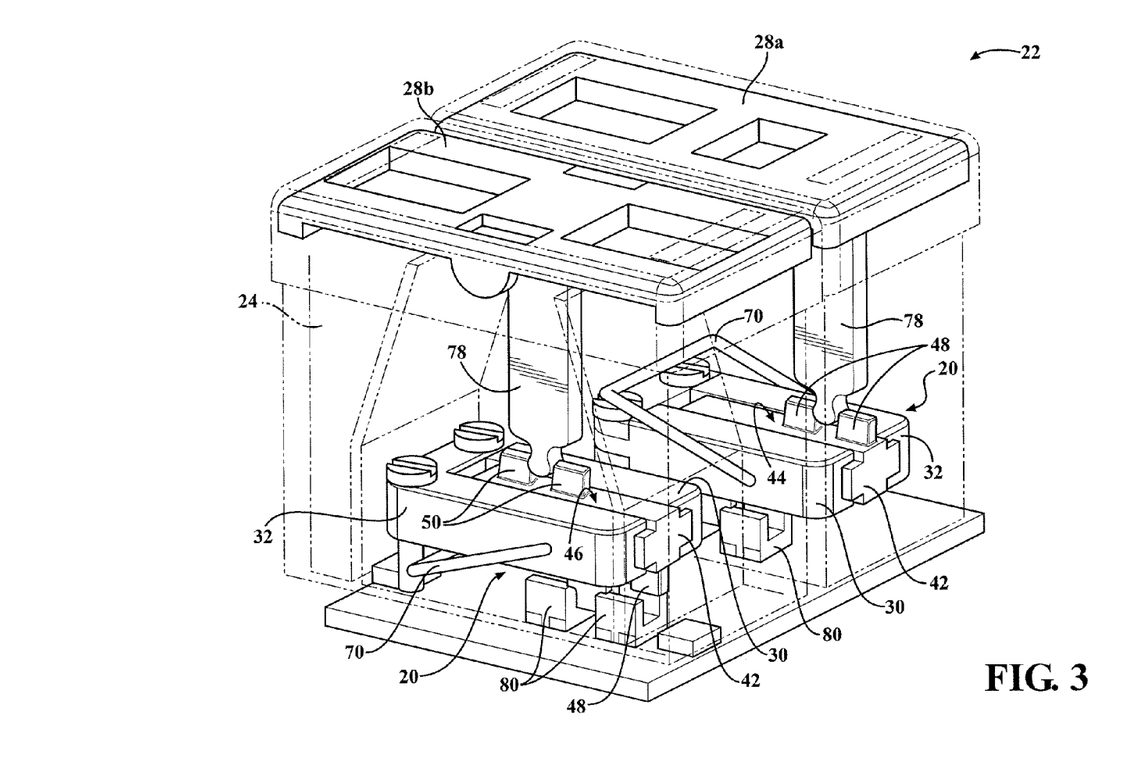
FIG. 3 is a perspective view of the shifting apparatus illustrating a single-actuation actuator and a multi-actuation actuator.

With reference to FIGS. 2 and 3, a housing 24 encases the gear shifting apparatus 22 and is adapted to be coupled to an interior of the vehicle. The gear shifting apparatus 22 typically includes a plurality of actuators 28. A user (not shown) may select various gear positions for the vehicle by moving each of the actuators 28 between an engaged and a disengaged position. The number of actuators 28 is based upon the number of gear selection choices required by the vehicle, and may vary from vehicle to vehicle. Any number of actuators 28 may be utilized without deviating from the scope of the disclosure. Additionally, the actuators 28 may take any form, such as, but not limited to buttons, switches, knobs, dials, toggles, levers and the like.

The actuators 28 may be single-actuation, such that the actuator 28 is movable between the disengaged position and the engaged position. The actuators 28 labeled "R" (representing reverse gear), "N" (representing neutral), and "A" (representing automatic, or more conventionally known as drive gear) are single-actuation actuators 28a. Alternatively, the actuators 28 may be multi-actuation, such that the actuator 28 is movable between a first engaged position and a second engaged position in addition to the disengaged position. The actuator 28 labeled +/− (representing manual shifting up and down) is a multi-actuation actuator 28b. It is to be appreciated that the multi-actuation actuator 28b may also be movable to additional engaged and disengaged positions without deviating from the scope of the disclosure. The operation of the actuators 28 will be discussed in greater detail below.

Figure 4:
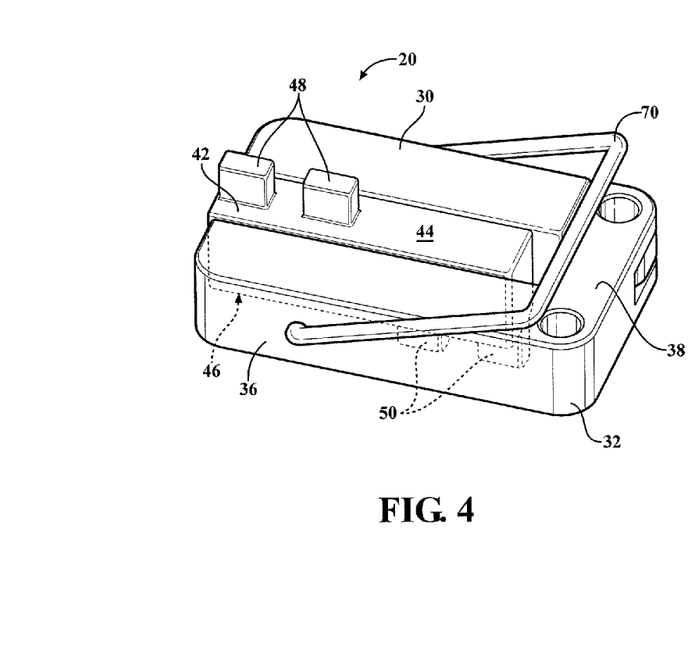
FIG. 4 is a perspective view of the haptic device.
Figure 5:
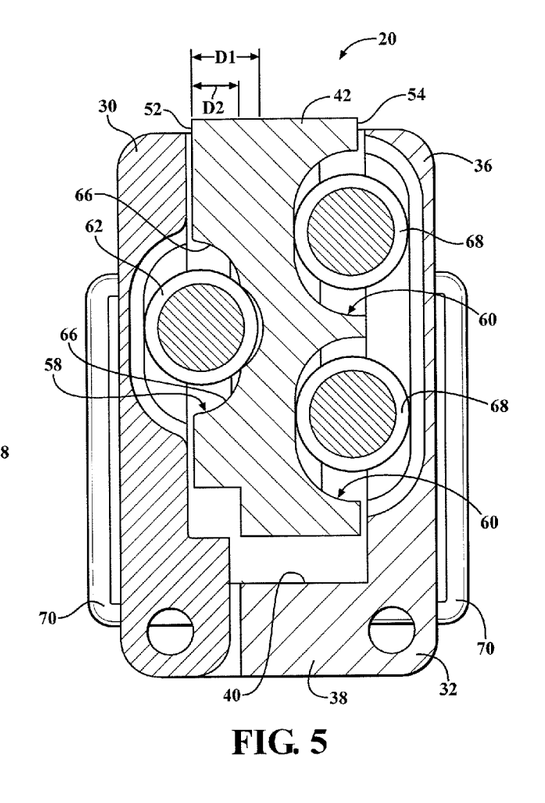
FIG. 5 is a cross-sectional view of the haptic device illustrating a slide in a first position.
Figure 6:
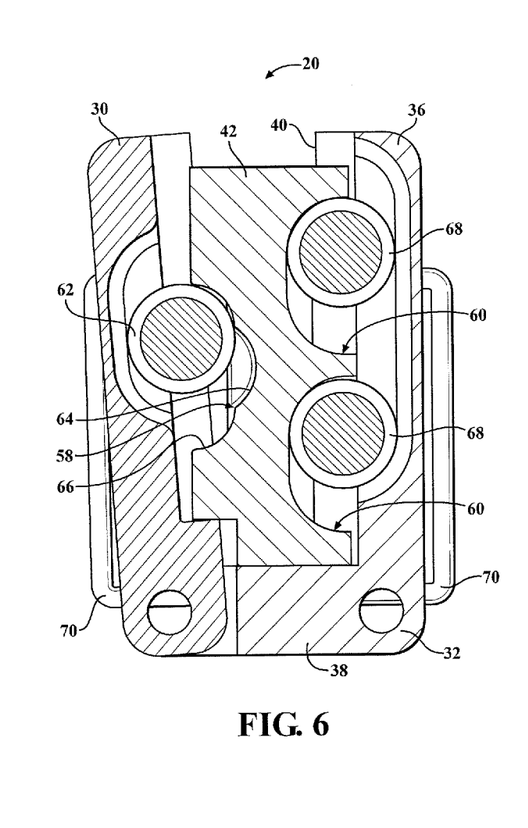
FIG. 6 is a cross-sectional view of the haptic device illustrating the slide in a second position.
Figure 7:
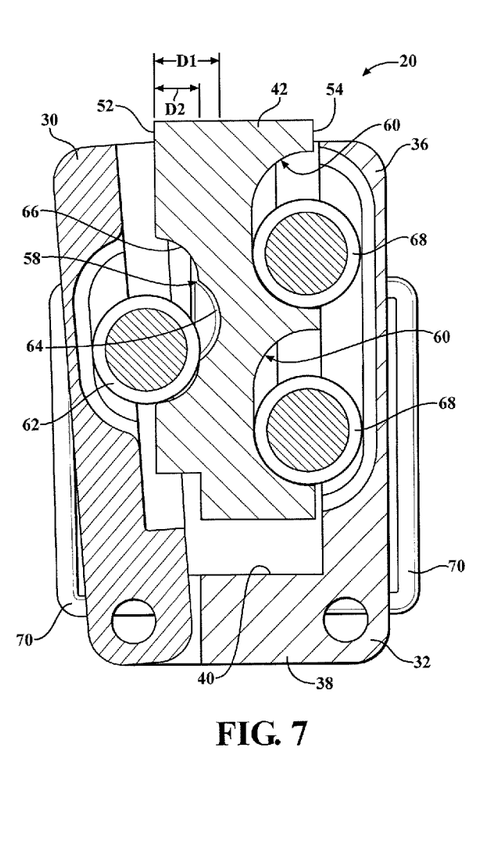
FIG. 7 is a cross-sectional view of the haptic device illustrating the slide in another second position.

The haptic device 20 provides a tactile feedback to the actuators 28. With reference to FIGS. 4-11, one embodiment of the haptic device 20 includes a first element 30 and a second element 32 hingedly coupled to one another. The first and second elements 30, 32 move relative to the one another when one of the actuators 28 is moved between the disengaged and the engaged positions. The first element 30 may rotatingly move from a rest position to a triggered position, relative to the second element 32, with the second element 32 remaining substantially fixed within the haptic device 20, as best shown in FIGS. 6 and 7. Alternatively, the second element 32 may rotatingly move relative to the first element 30 with the first element 30 remaining substantially fixed. In yet another alternative, both the first and second elements 30, 32 are movable relative to each other, with neither of the elements 30, 32 remaining fixed.

Figure 8:
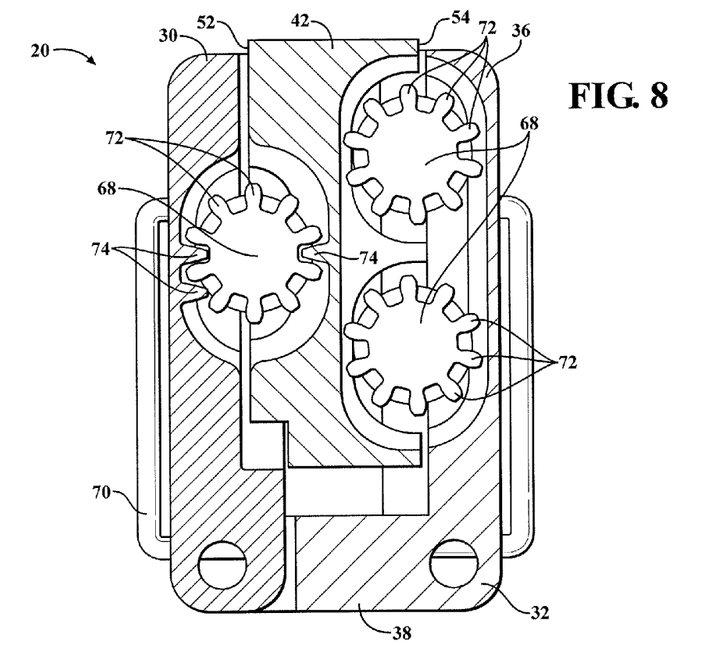
FIG. 8 is a partial cross-sectional view of the haptic device in the first position.
Figure 9:
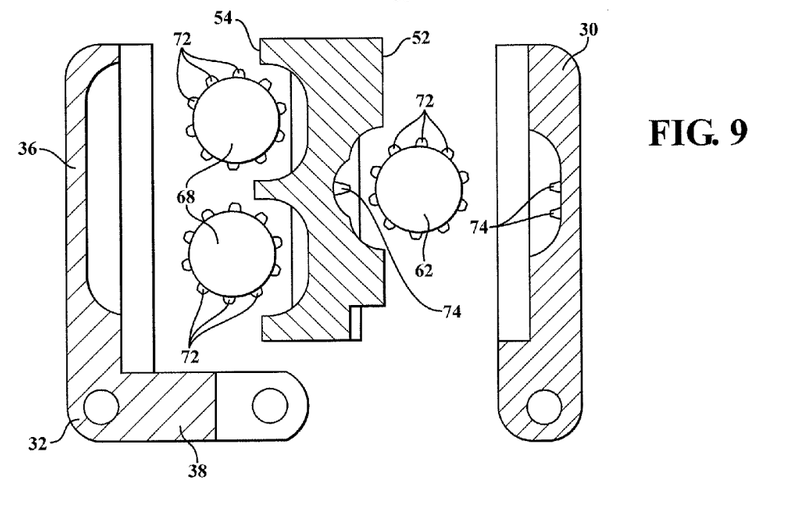
FIG. 9 is an exploded partial cross-sectional view of the haptic device.
Figure 10:
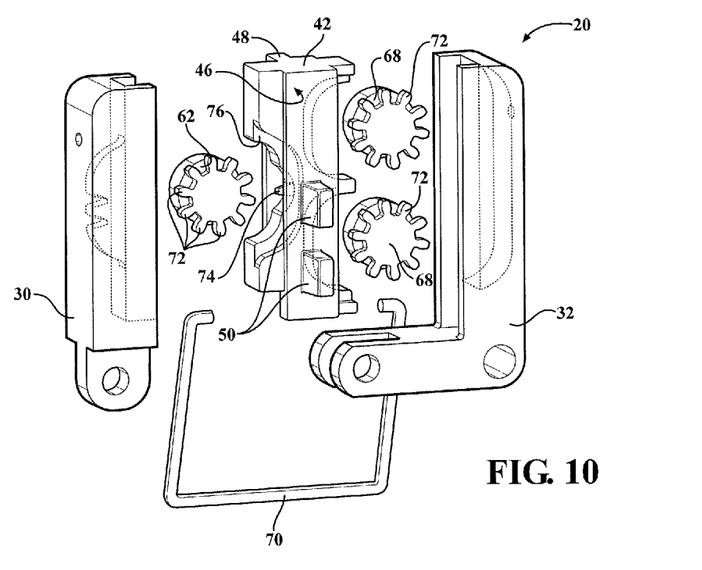
FIG. 10 is an exploded perspective view of the haptic device.

As best shown in FIGS. 9 and 10, the second element 32 may define a substantially L-shaped configuration having a long portion 36 and a short portion 38. The first element 30 is typically coupled to the short portion 38 of the second element 32. Together, the first and second elements 30, 32 create a substantially U-shaped configuration and define a space 40 therebetween as best shown in FIGS. 5 and 8. However, it is to be appreciated that alternative shapes and configurations of the first and second elements 30, 32, both individually and when coupled to one another, do not deviate from the scope of the disclosure. Additionally, it should be noted that the size and shape of the space 40 varies as the elements 30, 32 move relative to one another between the rest position and the triggered position, as best shown in FIGS. 6 and 7.

The haptic device 20 further includes a slide 42 disposed within the space 40 and moveable from a first position, when the elements 30, 32 are in the rest position, as shown in FIGS. 5 and 8, to at least one second position when the elements 30, 32 are in the triggered position, as shown in FIGS. 6 and 7. The slide 42 includes a first surface 44 and a second surface 46 spaced from and substantially parallel to the first surface 44. A first pair of legs 48 extends from the first surface 44, and a second pair of legs 50 extends from the second surface 46. As best shown in FIGS. 2-4, the first pair of legs 48 are offset from the second pair of legs 50 for allowing the haptic device 20 to be utilized with either the single-actuation actuator 28a or the multi-actuation actuator 28b. FIG. 3 best illustrates the different orientations of the haptic device 20 in relation to the actuators 28. As shown in the background of FIG. 3, the first surface 44 is facing upward with the first pair of legs 48 extending toward the actuators 28 to accommodate the single-actuation actuator 28a. To accommodate the multi-actuation actuator 28b, the haptic device 20 is simply inverted such that the second surface 46 is facing upward with the second pair of legs 50 extending toward the actuators 28, as shown in the foreground of FIG. 3. Said differently, the same haptic device 20 may be used with either type of actuator 28a, 28b by merely changing the orientation of the haptic device 20 in relation to the actuators 28.

The slide 42 further includes a first side wall 52 and a second side wall 54 spaced from the first side wall 52. Typically, one of the side walls 52, 54 defines a contoured surface 58 and the other of the side walls 52, 54 defines at least one guide recess 60. The contoured surface 58 presents a plurality of peaks and valleys of varying depths and shapes. In various embodiments, the contoured surface 58 may have varying degrees of complexity depending on the tactile feedback desired. The complexity of the pattern, including the depth of the valleys and the height of the peaks, will help define the tactile feedback created by the haptic device 20, as will be further explained below.

At least one cam follower 62 is disposed between the contoured surface 58 and one of the elements 30, 32. The cam follower 62 follows the contoured surface 58 as the slide 42 moves between the first and second positions. Referring to FIGS. 5-7, the contoured surface 58 comprises a central recess 64 having a first depth D1 and at least one outer recess 66 having a second depth D2 that is shallower than the first depth D1. The central recess 64 is configured to accept the cam follower 62 therein and allow the first element 30 to remain in the rest position. As the slide 42 moves toward the second position, the cam follower 62 enters the outer recess 66, thereby forcing the first element 30 to rotatingly move away from the second element 32 and toward the triggered position, as best shown in FIGS. 6 and 7.

At least one guide follower 68 is typically disposed between the guide recess 60 and one of the elements 30, 32 relative to each other. The guide follower 68 remains within the guide recess 60 as the slide 42 moves between the first and second positions. The guide follower 68 merely keeps the slide 42 moving smoothly and does not force the elements 30, 32 to move relative to each other. With reference to FIGS. 5-10, two guide followers 68 may be utilized to guide the slide 42 between the elements 30, 32. However, it is to be appreciated that additional or fewer guide followers 68 may be employed without deviating from the scope of the disclosure.

A biasing member 70 is coupled to at least one of the first and second elements 30, 32 and exerts a biasing force for continuously biasing the first and second elements 30, 32 toward one another. The biasing member 70 may be coupled to both the first and second elements 30, 32. Alternatively, the biasing member 70 may be coupled to one of the elements 30, 32 and the housing 24. The biasing member 70 may be a torsion spring defining a generally C-shaped configuration, as best shown in FIG. 10. Alternatively, the biasing member 70 may be another type of spring or other member that will bias or urge the first and second elements 30, 32 toward each other. As the elements 30, 32 move from the rest position toward the triggered position, when the actuators 28 are engaged, the biasing force of the biasing member 70 must be overcome.

Figure 11:
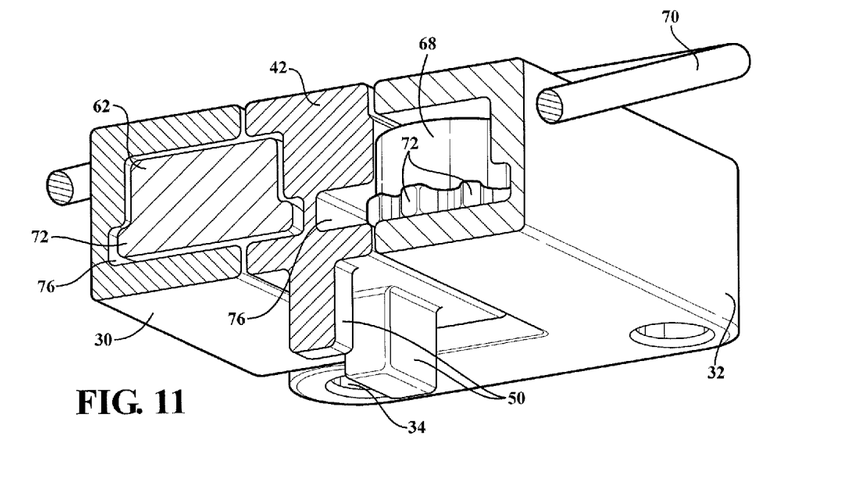
FIG. 11 is a perspective cross-sectional end view of the haptic device.

Keeping the cam follower 62 and the guide follower 68 aligned with the slide 42 and the respective element 30, 32 may be accomplished with various techniques. Referring now to FIGS. 8-11, both the cam follower 62 and the guide follower 68 include a plurality of teeth 72. A plurality of cogs 74 may extend from the slide 42 and/or the elements 30, 32 and are disposed adjacent the followers 62, 68. The teeth 72 on the followers 62, 68 mesh with the cogs 74 to ensure alignment of the followers 62, 68 with the slide 42 and the elements 30, 32. Alternatively, each of the first and second side walls 52, 54 of the slide 42 as well as each of the first and second elements 30, 32 define a tooth path 76, as best shown in FIG. 11. The teeth 72 of each of the followers 62, 68 are disposed within the respective tooth path 76 for keeping the followers 62, 68 aligned with the slide 42 and the elements 30, 32. In yet another alternative, both of these alignment techniques may be utilized together. It is to be appreciated the other alignment techniques may also be employed without deviating from the scope of the disclosure.

Referring back to FIGS. 2 and 3, a link 78 is disposed between each of the actuators 28 and the respective haptic device 20. Specifically, the link 78 couples each of the actuators 28 to the slide 42 for translating the slide 42 from the first position toward the second position as each of the actuators 28 is moved from the disengaged position to the engaged position respectively. The link 78 is coupled to the slide 42 between either the first pair of legs 48, for a single-actuation actuator 28a, or the second pair of legs 50, for a multi-actuation actuator 28b, extending toward the actuators 28. When each of the actuators 28 are released, the biasing force of the biasing member 70 forces the first and second elements 30, 32 back to the rest position. The biasing force is transmitted through the slide 42 and the link 78 to each of the respective actuators 28, thereby causing the tactile feedback to the actuators 28.

The gear shifting apparatus 22 may further include a sensor 80 for detecting the gear selection. Typically the sensor 80 is disposed under the haptic device 20, opposite the link 78, as best shown in FIGS. 2 and 3. The sensor 80 detects movement of the slide 42 and communicates the selection to a controller (not shown). The controller determines if the gear selection is allowed based on vehicle conditions. For example, if the vehicle is traveling on the highway at a high rate of speed and the reverse gear actuator is engaged, the controller will over ride the selection and not allow the vehicle to shift into the reverse gear. The sensor 80 is not particularly limited and may comprise any number of devices. For example, the sensor 80 may be any one of, but is not limited to, a micro-switch, an optical-sensor, a hall-sensor, a reed-sensor, or any other appropriate device that can detect movement of the slide 42 and/or engagement of the actuators 28.

With reference to FIGS. 12-16, another embodiment of a haptic device is shown at 82. The haptic device 82 of this embodiment also includes a first element 30 and a second element 32 coupled to one another. However, the first element 30 is slidingly coupled to the second element 32. The first element 30 slides along the second element 32 between a rest position and a triggered position when the actuator 28 is moved between a disengaged position and an engaged position respectively. In other words, the first element 30 of the haptic device 82 moves linearly relative to the second element 32.

Figure 12:
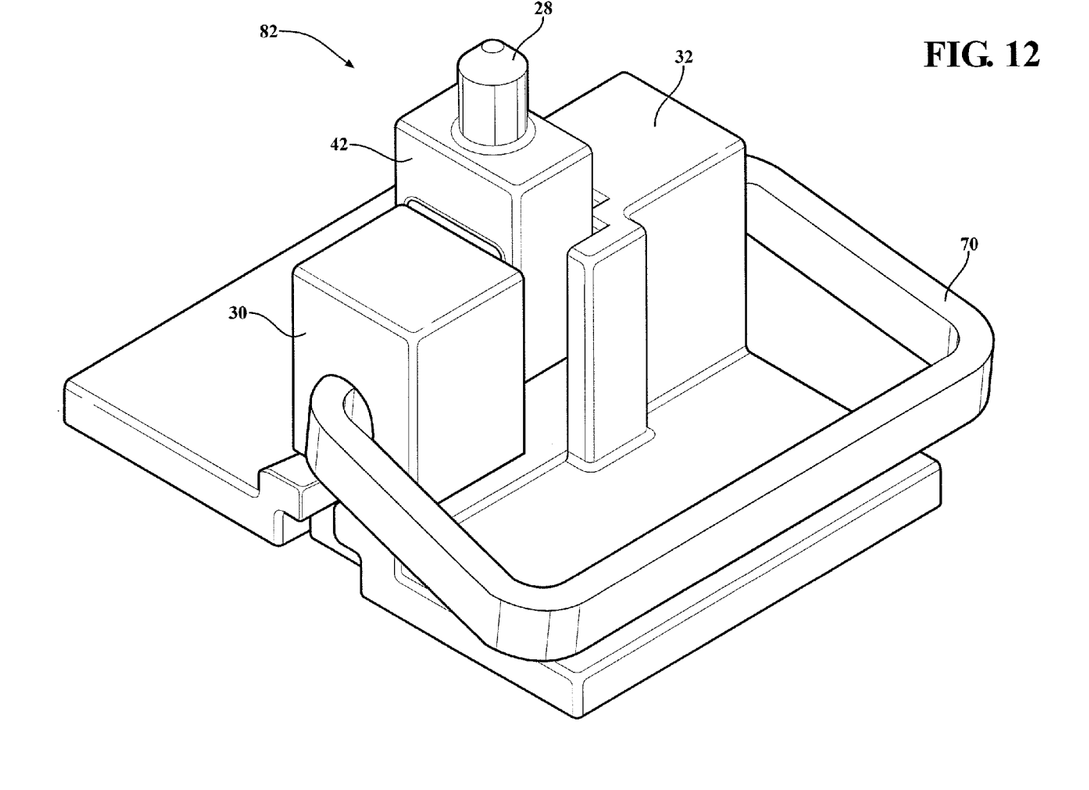
FIG. 12 is a perspective view of a haptic device of an alternative embodiment in a first position.
Figure 13:
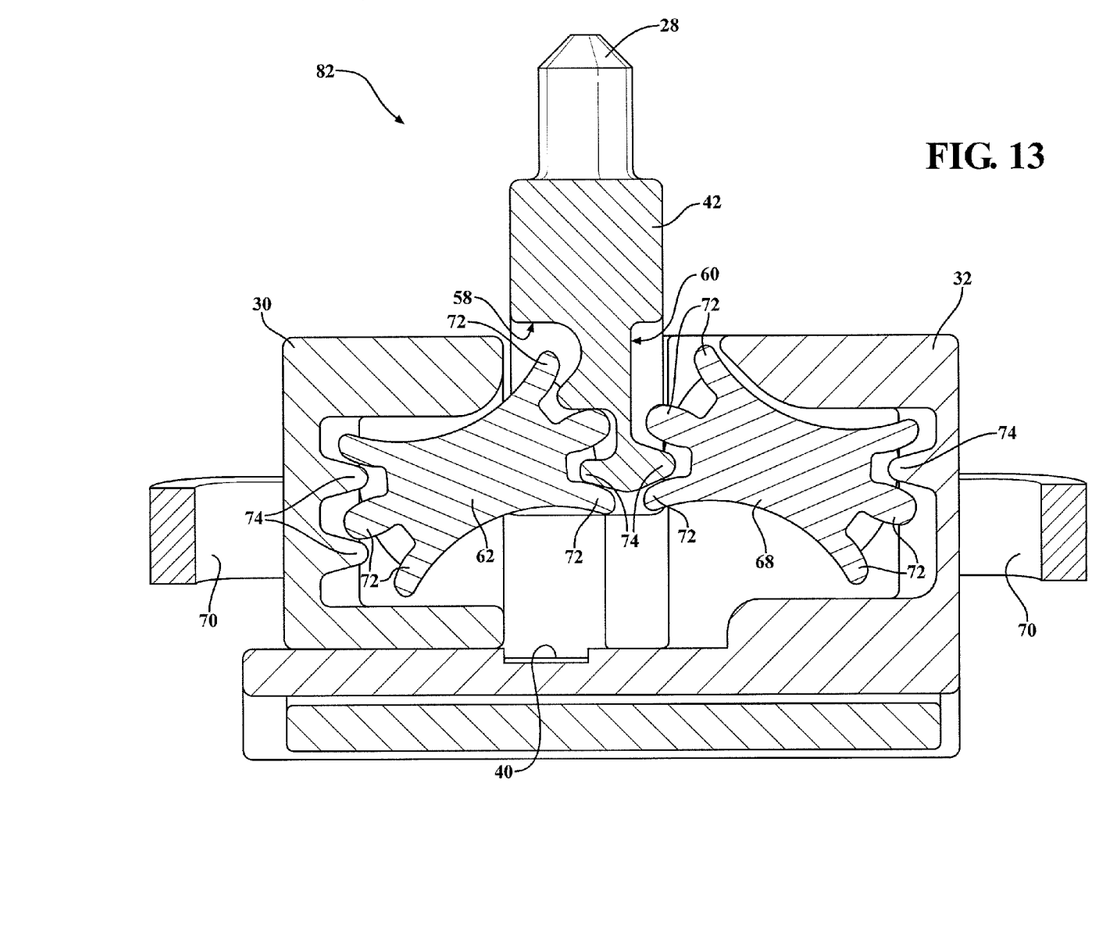
FIG. 13 is a partial cross-sectional view of the haptic device of the alternative embodiment in the first position.
Figure 14:
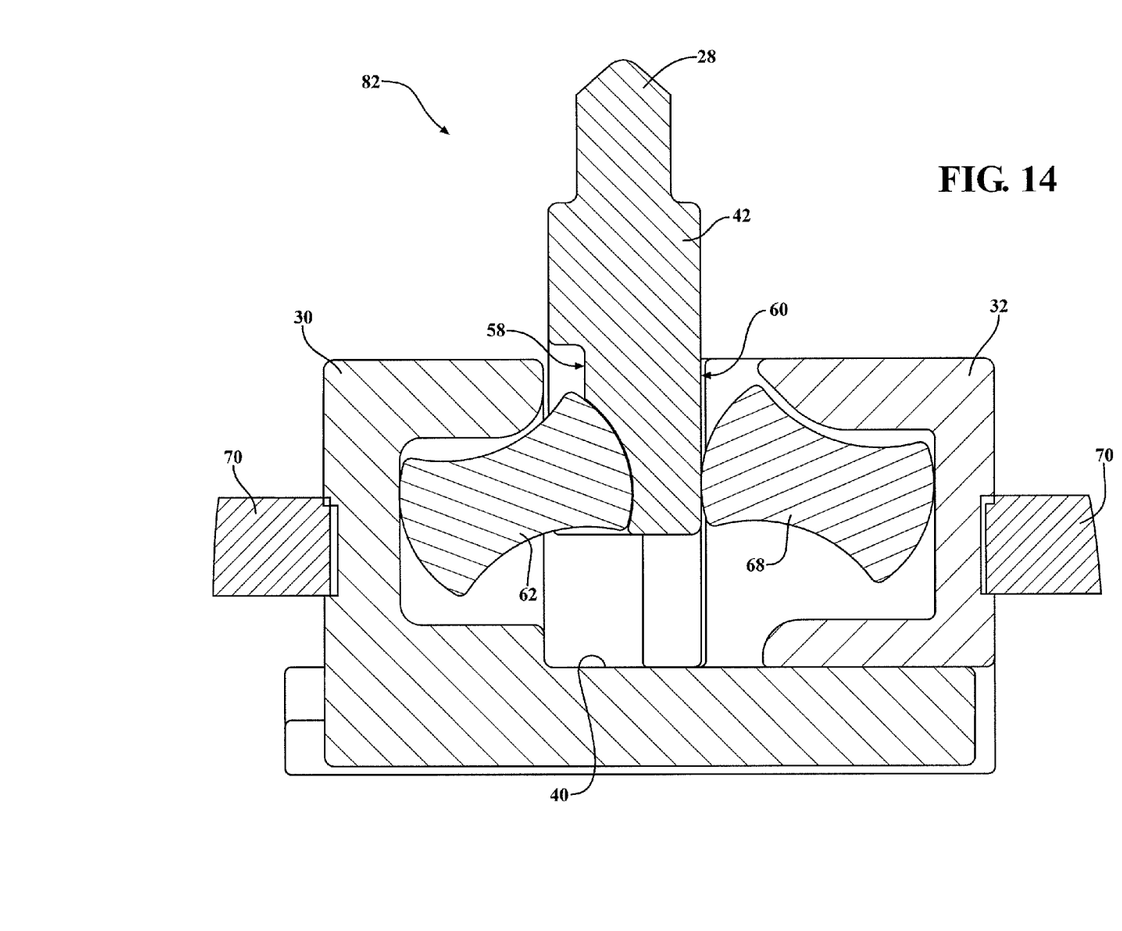
FIG. 14 is a cross-section cross-sectional view of the haptic device of the alternative embodiment in the first position.
Figure 15:
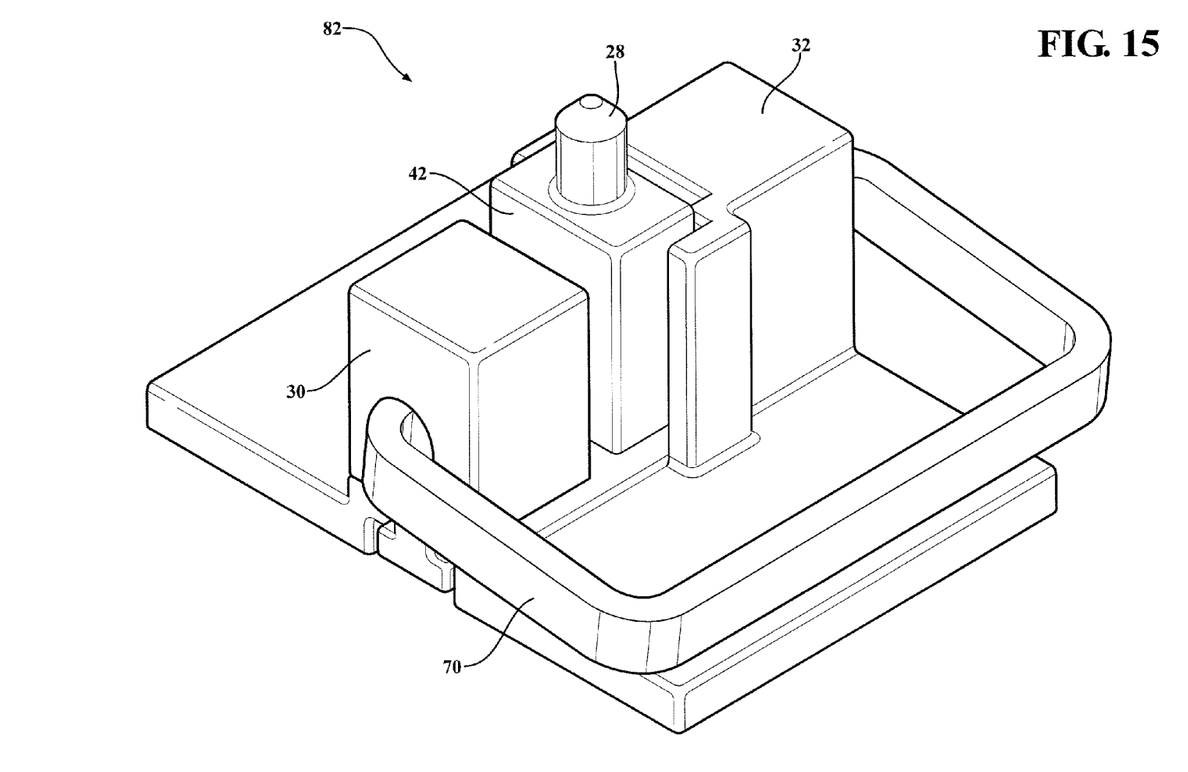
FIG. 15 is a perspective view of the haptic device of the alternative embodiment in a second position.
Figure 16:
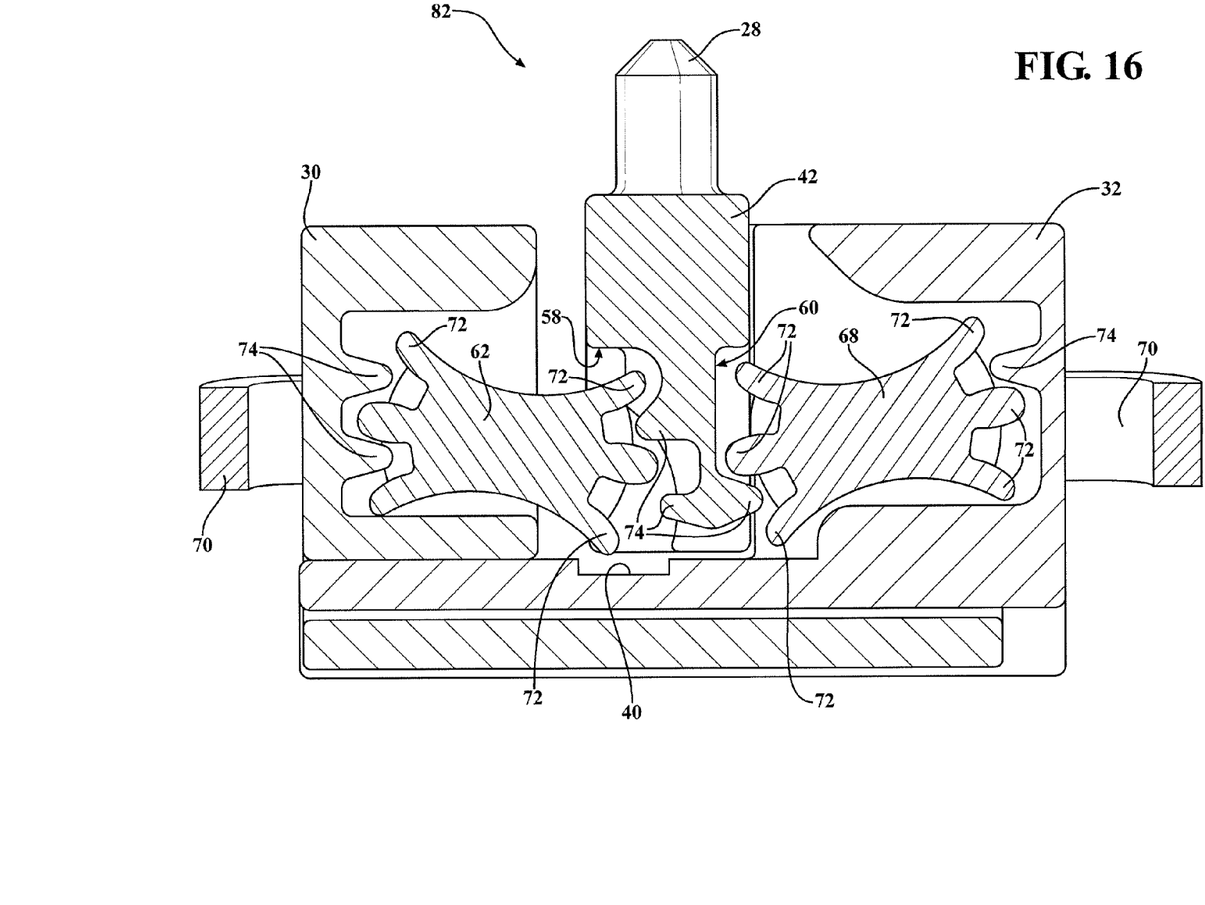
FIG. 16 is a partial cross-sectional view of the haptic device of the alternative embodiment in the second position.
Figure 17:
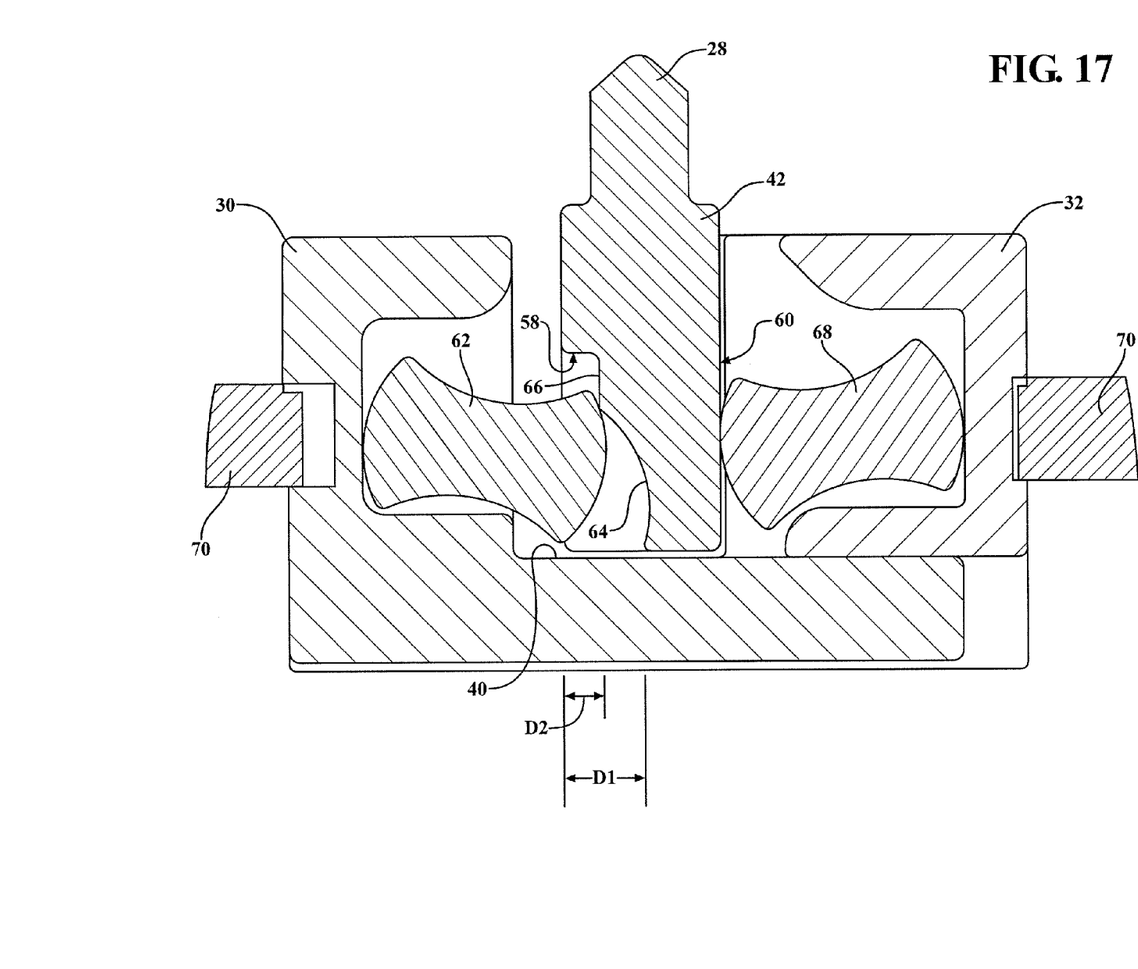
FIG. 17 is a cross-sectional view of the haptic device of the alternative embodiment in the second position.

A biasing member 70 continuously biases the first and second elements 30, 32 toward the rest position. Similar to embodiment described above, the first and second elements 30, 32 define a space 40 therebetween. However, in this embodiment of the haptic device 82, the slide 42 and the actuator 28 may be integrally formed and therefore a link is not required to couple the slide 42 to the actuator 28. The slide 42 is moveable within the space 40 from the first position when the elements 30, 32 are in the rest position as shown in FIGS. 12-14, to a second position when the elements 30, 32 are in the triggered position as shown in FIGS. 15-17. The slide 42 defines a contoured surface 58 and a guide recess 60 spaced from the contoured surface 58.

The haptic device 82 includes a cam follower 62 disposed between the first element 30 and the contoured surface 58. Additionally, the haptic device 82 further includes a guide follower 68 disposed between second element 32 and the guide recess 60. Both the cam follower 62 and the guide follower 68 include a plurality of teeth 72. The slide 42 defines a plurality of cogs 74 for meshing with the teeth defined by the followers 62, 68 to ensure alignment of the slide 42 within the haptic device 82. As the actuator 28 is pressed, thereby moving the slide 42 toward the second position, the cam follower 62 remains in contact with the contoured surface 58 and forces the first element 30 away from the second element 32. When the actuator is pressed, the biasing force of the biasing member 70 must be overcome, thereby causing the tactile feedback to the actuator 28. When the actuator 28 is released, the first element 30 moves back toward the second element 32 and into the rest position.

The present invention also contemplates a method of shifting the gear position by the user of the vehicle, using the gear shifting apparatus 22 as described above. The method includes the step of providing at least one of the actuators 28 within the vehicle. The method may further include the step of engaging at least one of the actuators 28 to select the desired gear position. The method may further include the step of moving the slide 42 from the first position to the second position. The method may further include the step of urging the pair of elements 30, 32 from the rest position to the triggered position. The method may further include creating the tactile feedback to each of the respective actuators 28. The method may further include the step of disengaging the actuators 28. The method may further include the step of returning the slide 42 to the first position.

The present invention has been described in an illustrative manner, and it is to be understood that the terminology which as been used in intended to be in the nature of words of description rather than of limitation. Obviously, many modifications and variations of the present invention are possible in light of the above teachings. The invention may be practiced otherwise than as specifically described within the scope of the appended claims.

What is claimed is:

1. A shifting apparatus including a controller for selecting a gear position in a vehicle, said apparatus comprising:
   a housing adapted to be disposed within the vehicle;
   an actuator coupled to said housing and movable between an engaged position and a disengaged position within said housing; and
   a haptic device coupled to said actuator, said haptic device comprising;
   a first element,
   a second element coupled to said first element and defining a space between said first and second elements with said first and second elements movable relative to one another between a rest position and a triggered position as said actuator is moved between said disengaged and said engaged positions respectively,
   a biasing member coupled to at least one of said first and second elements and continuously biasing said first and second elements toward one another,
   a slide having a contoured surface and at least one guide recess having a linear path, said slide being disposed within said space with said slide movable from a first position with said first and second elements in said rest position, to a second position moving said first and second elements to said triggered position,
   at least one cam follower engaging said slide and following said contoured surface with said cam follower selectively engaging one of said first and second elements to cause said first and second elements to move relative to each other as said slide moves toward said second position thereby causing a tactile feedback to said actuator; and
   at least one guide follower disposed in said at least one guide recess and remaining within said at least one guide recess as said slide moves between said first and second positions for guiding said slide between said first and second positions to keep said slide moving smoothly as said at least one guide follower moves in the linear path.

2. The shifting apparatus as set forth in claim 1 wherein said slide moving between said first and second positions changes a shape of said space.

3. The shifting apparatus as set forth in claim 1 further including a link coupling said actuator to said slide and moving said slide toward said second position when said actuator is moving toward said engaged position.

4. The shifting apparatus as set forth in claim 1 wherein said biasing member biases said first and second elements toward one another thereby urging said slide toward said first position when said actuator is moving toward said disengaged position.

5. The shifting apparatus as set forth in claim 1 wherein said actuator urges said slide in at least one direction when said actuator is moved toward said engaged position.

6. The shifting apparatus as set forth in claim 1 wherein said actuator moves in a linear motion.

7. The shifting apparatus as set forth in claim 1 wherein said actuator moves in a rocking motion.

8. The apparatus as set forth in claim 1 wherein said biasing member is a torsion spring.

9. A haptic device for an actuator of a gear selector for a vehicle, said haptic device comprising:
   a first element;
   a second element coupled to said first element and defining a space between said first and second elements with said first and second elements movable relative to one another from a rest position when the actuator is in a disengaged position, to a triggered position when the actuator is moved to an engaged position;
   a biasing member coupled to at least one of said first and second elements and continuously biasing said first and second elements toward one another;
   a slide having a contoured surface and at least one guide recess having a linear path, said slide being disposed within said space with said slide movable from a first position with said first and second elements in said rest position, to a second position moving said first and second elements to said triggered position;
   at least one cam follower engaging said slide and following said contoured surface with said cam follower selectively engaging one of said first and second elements to cause said first and second elements to move relative to each other as said slide moves toward said second position thereby causing a tactile feedback to the actuator; and
   at least one guide follower disposed in said at least one guide recess and remaining in said at least one guide recess as said slide moves between said first and second positions for guiding said slide between said first and second positions to keep said slide moving smoothly as said at least one guide follower moves in the linear path.

10. The haptic device as set forth in claim 9 wherein said slide moving between said first and second positions changes a shape of said space.

11. The haptic device as set forth in claim 9 wherein said biasing member biases said first and second elements toward one another thereby urging said slide toward said first position.

12. The haptic device as set forth in claim 9 wherein said biasing member is a torsion spring.

* * * * *